US012684474B2

(12) United States Patent
Singh et al.

(10) Patent No.: US 12,684,474 B2
(45) Date of Patent: Jul. 14, 2026

(54) DETERMINING AND PRESENTING AN INDICATION OF A CLOSEST CELLULAR SERVICE LOCATION

(71) Applicant: Apple Inc., Cupertino, CA (US)

(72) Inventors: Ajoy K. Singh, Milpitas, CA (US);
Mansi Goyal, Sunnyvale, CA (US);
Jared K. McGann, San Jose, CA (US);
Keven M. Kachar, San Francisco, CA (US); Todd R. Grooms, Nashville, TN (US); Ozgur Ekici, Ottawa (CA);
Alexander M. Bubin, San Jose, CA (US); Ajay Kumar S. Gupta, Cupertino, CA (US); Yifan Zhu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 331 days.

(21) Appl. No.: 18/349,800

(22) Filed: Jul. 10, 2023

(65) Prior Publication Data

US 2025/0024357 A1      Jan. 16, 2025

(51) Int. Cl.
H04W 48/18        (2009.01)
H04W 4/029        (2018.01)

(52) U.S. Cl.
CPC ........... H04W 48/18 (2013.01); H04W 4/029 (2018.02)

(58) Field of Classification Search
CPC ....... H04W 48/16; H04W 4/02; H04W 48/18;
H04W 4/029; H04W 4/80; H04W 88/02;
H04W 8/20; H04W 48/04; H04W 12/08;
H04W 8/18; H04W 4/50; H04W 88/06;
H04W 8/183; H04W 64/00; H04W 8/005;

H04W 84/12; H04W 60/04; H04W 72/51;
H04W 48/20; H04W 48/08; H04W 76/10;
H04W 8/205; H04W 88/08; H04W 12/06;
H04W 12/35; H04W 64/006; H04W
76/15; H04W 12/40; H04W 24/10; H04W
48/12;

(Continued)

(56) References Cited

U.S. PATENT DOCUMENTS 9,491,693 B1 * 11/2016 Chuttani ............... H04W 48/16
9,807,661 B1 * 10/2017 Manepalli ......... H04W 52/0258
(Continued)

FOREIGN PATENT DOCUMENTS

EP          2904851          4/2019
TW          201134256        10/2011
(Continued)

OTHER PUBLICATIONS

Office Action for TW 113125766; Feb. 21, 2025.
International Search Report and Written Opinion for PCT/US2024/036701; Oct. 9, 2024.

*Primary Examiner* — Jing Gao
(74) *Attorney, Agent, or Firm* — Kowert, Hood, Munyon, Rankin & Goetzel, P.C.

(57)          ABSTRACT

A wireless device may receive cellular connectivity event information. The wireless device may determine a closest cellular service availability location for the wireless device based at least in part on the cellular connectivity event information. An indication of the closest cellular service availability location may be presented via one or more user (Continued)

interface elements. The closet cellular service availability location may be different than a most recent cellular service availability location.

20 Claims, 6 Drawing Sheets

(58) Field of Classification Search
CPC ......... H04W 8/22; H04W 48/06; H04W 8/02; H04W 4/027; H04W 60/06; H04W 88/18; H04W 12/63; H04W 28/0215; H04W 28/0226; H04W 36/00837; H04W 36/08; H04W 36/14; H04W 52/0251; H04W 12/0431; H04W 12/43; H04W 4/025; H04W 40/24; H04W 52/0225; H04W 52/0241; H04W 36/0085; H04W 36/008375; H04W 36/305; H04W 36/322; H04W 4/024; G06Q 30/0261; H04L 67/52; H04L 63/0853; H04L 2101/65; G01S 5/0236
See application file for complete search history.

(56) References Cited

U.S. PATENT DOCUMENTS

| | | | | |
|---|---|---|---|---|
| 2002/0115445 A1* | 8/2002 | Myllymaki | ............ | H04W 4/02 |
| | | | | 455/456.3 |
| 2017/0188307 A1* | 6/2017 | Huang | ............. | H04M 1/72457 |
| 2022/0166768 A1 | 5/2022 | Barkan | | |
| 2022/0201429 A1 | 6/2022 | Schoenberg | | |
| 2022/0256308 A1 | 8/2022 | Volkerink | | |
| 2022/0312146 A1 | 9/2022 | Haney | | |
| 2022/0351245 A1 | 11/2022 | Hardin | | |
| 2023/0007466 A1* | 1/2023 | Crane | ................... | H04W 8/183 |
| 2023/0137352 A1 | 5/2023 | Gottehrer | | |
| 2023/0224055 A1* | 7/2023 | Ramiro Moreno | .. | H04B 17/373 |
| | | | | 370/252 |
| 2024/0121707 A1* | 4/2024 | Orcutt | .................. | H04W 48/18 |
| 2025/0317826 A1* | 10/2025 | Howe | ................ | H04L 41/5012 |

FOREIGN PATENT DOCUMENTS

| | | |
|---|---|---|
| WO | 2011163055 | 12/2021 |
| WO | 2022235321 | 11/2022 |

* cited by examiner

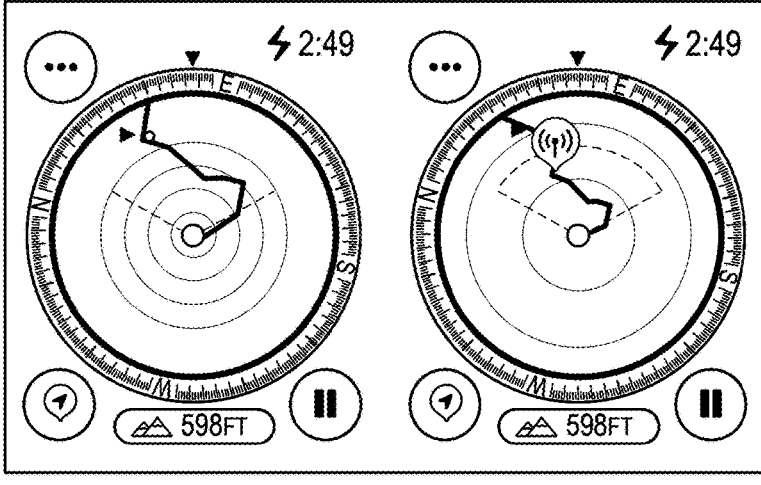
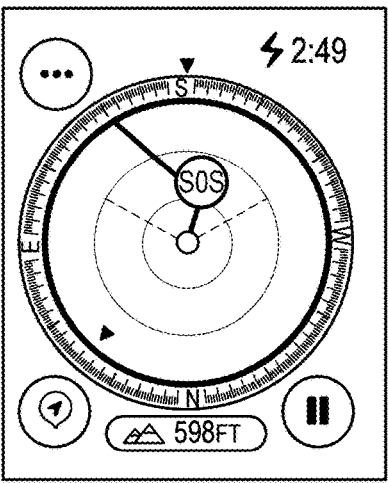
FIG. 7               FIG. 8
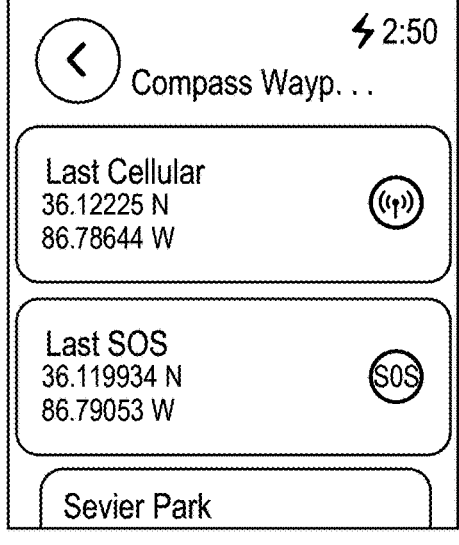
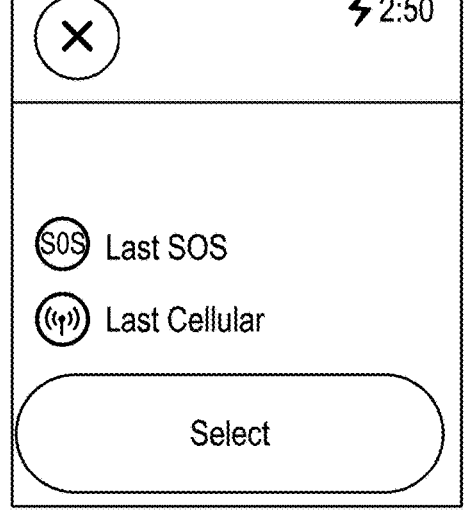
FIG. 9               FIG. 10

DETERMINING AND PRESENTING AN INDICATION OF A CLOSEST CELLULAR SERVICE LOCATION

FIELD

The present application relates to wireless communications, and more particularly to systems, apparatuses, and methods for determining and presenting an indication of a closest cellular service location in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

Mobile electronic devices may take the form of smart phones or tablets that a user typically carries. Wearable devices (also referred to as accessory devices) are a newer form of mobile electronic device, one example being smart watches. Typically, wearable devices have relatively limited wireless communications capabilities and typically have smaller batteries than larger portable devices, such as smart phones and tablets.

Although cellular service may be widely available in many locations, there may continue to be locations (e.g., wilderness, sparsely populated areas, etc.) where service is not available. When a user is in such a location, it may not always be obvious how to return to a location in which cellular service is available. Therefore, improvements in the field are desired.

SUMMARY

Embodiments are presented herein of apparatuses, systems, and methods for determining and presenting an indication of a closest cellular service location in a wireless communication system.

According to the techniques described herein, a wireless device may make use of cellular connectivity event information, which may include information regarding changes in cellular service availability status for the wireless device or a companion wireless device, to determine one or more nearby locations at which cellular service is estimated to be available to the wireless device. The determined locations may include the closest location with a specific type of cellular service available, the closest location with any cellular service available, and/or any of various other possible locations at which cellular service (possibly of a specific type) is likely to be available based on the information available to the wireless device.

The wireless device may be capable of presenting an indication of such a determined location via a user interface of the wireless device. For example, a visual or audio indication could be presented to a user of the wireless device to assist the user to determine the direction and distance of the determined location. Such an indication could be presented in response to user input that explicitly requests the information or is otherwise indicative of the information being potentially useful to the user, such as an attempt to make use of a specific type of cellular service that is not currently available at the wireless device, among various possibilities.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 7-10 illustrate aspects of various possible ways in which an example compass application could provide an indication of nearby cellular service locations, according to various embodiments.

Figure 1:
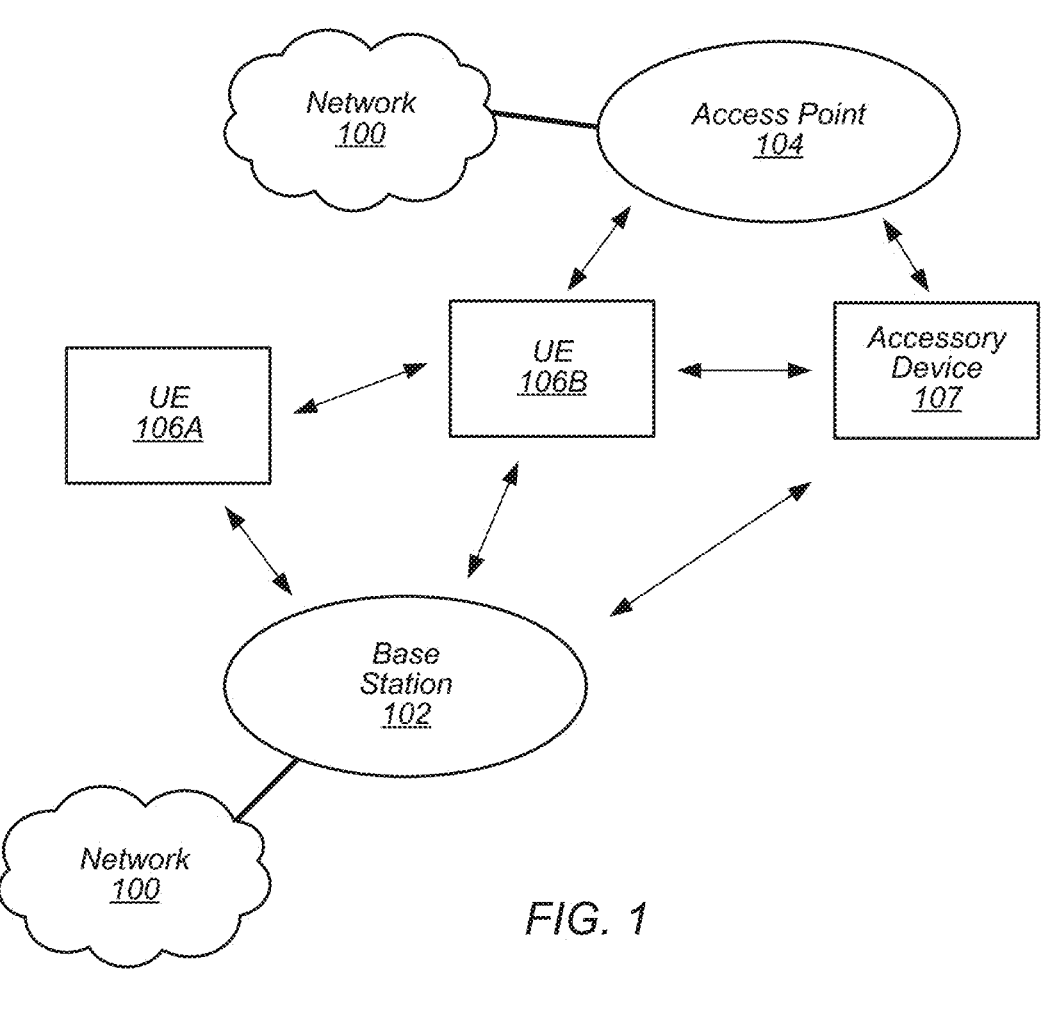
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
  UE: User Equipment
  RF: Radio Frequency
  BS: Base Station
  GSM: Global System for Mobile Communication
  UMTS: Universal Mobile Telecommunication System
  LTE: Long Term Evolution.
  NR: New Radio
  TX: Transmission/Transmit
  RX: Reception/Receive
  RAT: Radio Access Technology
  TRP: Transmission-Reception-Point

Terms

The following is a glossary of terms that may appear in the present disclosure:
  Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.
  Carrier Medium—a memory medium as described above, as well as a physical transmission medium, such as a bus, network, and/or other physical transmission medium that conveys signals such as electrical, electromagnetic, or digital signals.
  Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.
  Wireless Device—any of various types of computer systems or devices that perform wireless communications. A wireless device can be portable (or mobile) or may be stationary or fixed at a certain location. A UE is an example of a wireless device.
  Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.
  Base Station (BS)—The term "Base Station" has the full breadth of its ordinary meaning, and at least includes a wireless communication station installed at a fixed location and used to communicate as part of a wireless telephone system or radio system.
  Link Budget Limited—includes the full breadth of its ordinary meaning, and at least includes a characteristic of a wireless device (a UE) that exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over a RAT with a base station may be inherently link budget limited due to its reduced transmit/receive power and/or reduced antenna. Wearable devices, such as smart watches, may commonly be link budget limited devices. Alternatively, a device may not be inherently link budget limited, e.g., may have sufficient size, battery power, and/or transmit/receive power for normal communications over a RAT, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.
  Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well as any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
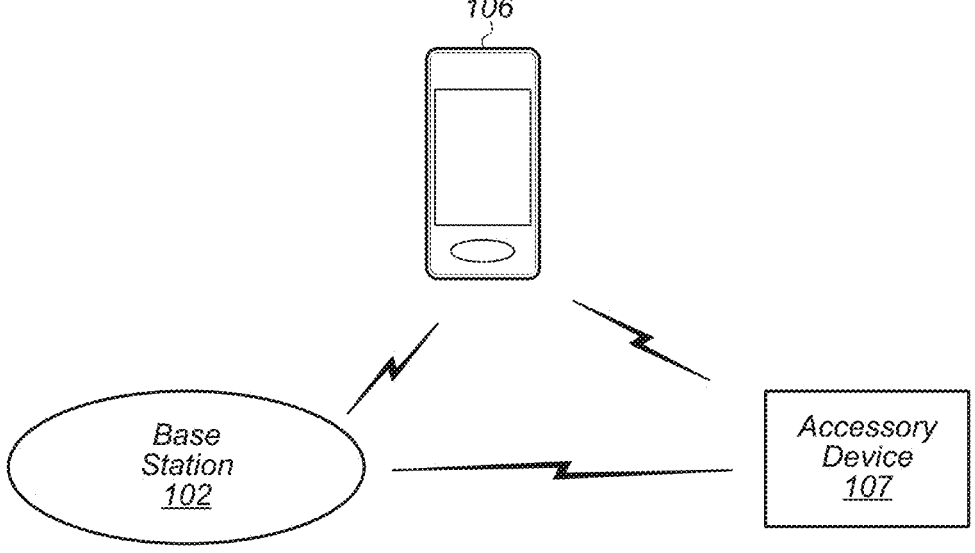
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a cellular base station 102, which communicates over a transmission medium with one or more (e.g., an arbitrary number of) wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware and/or software that enables wireless communication with the UEs 106A, 106B, and 107. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

Note that, at least in some 3GPP NR contexts, base station (gNB) functionality can be split between a centralized unit (CU) and a distributed unit (DU). The illustrated base station 102 may support the functionality of either or both of a CU or a DU, in such a network deployment context, at least according to some embodiments. In some instances, the base station 102 may be configured to act as an integrated access and backhaul (IAB) donor (e.g., including IAB donor CU and/or IAB donor DU functionality). In some instances, the base station 102 may be configured to act as an IAB node (e.g., including IAB mobile termination (MT) and IAB-DU functionality). Other implementations are also possible.

The base station 102 and the user devices may be configured to communicate over the transmission medium using any of various radio access technologies (RATs), also referred to as wireless communication technologies, or telecommunication standards, such as LTE, LTE-Advanced (LTE-A), LAA/LTE-U, 5G NR, Wi-Fi, etc.

Base station 102 and other similar base stations (not shown) operating according to the same or a different cellular communication standard may thus be provided as one or more networks of cells, which may provide continuous or nearly continuous overlapping service to UEs 106A-B and 107 and similar devices over a geographic area via one or more cellular communication standards.

Note that a UE 106/107 may be capable of communicating using multiple wireless communication standards. For example, a UE 106 might be configured to communicate using either or both of LTE and NR. In some embodiments, the UE 106/107 may be configured to perform techniques for determining and presenting an indication of a closest cellular service location in a wireless communication system, such as according to the various methods described herein. The UE 106/107 might also or alternatively be configured to communicate using WLAN, BLU-ETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

As shown, the exemplary wireless communication system also includes a Wi-Fi access point 104, which communicates over a transmission medium with the wireless device 106B as well as accessory device 107. The Wi-Fi Access point also provides communicative connectivity to the network 100. Thus, according to some embodiments, wireless devices may be able to connect to either or both of the base station 102 (or another cellular base station) and the access point 104 (or another access point) to access the network 100 at a given time.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102.

The accessory device 107 includes cellular communication capability and hence is able to directly communicate with cellular base station 102. However, since the accessory device 107 is possibly one or more of communication, output power and/or battery limited, the accessory device 107 may in some instances selectively utilize the UE 106B as a proxy for communication purposes with the base station 102 and hence to the network 100, and/or may prioritize access to the network 100 obtained via the access point 104. In other words, the accessory device 107 may selectively use the cellular communication capabilities of its companion device (e.g., UE 106B) and/or its Wi-Fi communication capability to conduct its communications. The limitation on communication abilities of the accessory device 107 can be permanent, e.g., due to limitations in output power or the radio access technologies (RATs) supported, or temporary, e.g., due to conditions such as current battery status, inability to access a network, or poor reception.

FIG. 2 illustrates exemplary user equipment devices 106 and 107 in communication with a base station 102, according to some embodiments. The UEs 106/107 may include any of various possible devices with wireless network connectivity such as a mobile phone, a hand-held device, a wearable device, a computer or a tablet, an unmanned aerial vehicle (UAV), an unmanned aerial controller (UAC), an automobile, or virtually any type of wireless device.

The UEs 106/107 may include a processor (processing element) that is configured to execute program instructions stored in memory. The UEs 106/107 may perform any of the method embodiments described herein by executing such stored instructions. Alternatively, or in addition, the UEs 106/107 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UEs 106/107 may be configured to communicate using any of multiple wireless communication protocols. For example, either or both of the UEs 106/107 may be configured to communicate using two or more of LTE, LTE-A, 5G NR, Wi-Fi, BLUETOOTH™, or GNSS. Other combinations of wireless communication standards are also possible.

The UEs 106/107 may include one or more antennas for communicating using one or more wireless communication protocols according to one or more RAT standards. In some embodiments, one or more of the UEs 106/107 may share one or more parts of a receive chain and/or transmit chain between multiple wireless communication standards. The shared radio may include a single antenna, or may include multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, either or both of the UE 106/107 may share one or more parts of a receive and/or transmit chain between multiple wireless communication technologies, such as those discussed above.

In some embodiments, the UEs 106/107 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UEs 106/107 and/or BS 102 may be configured to apply different "weight" to different antennas. The process of applying these different weights may be referred to as "precoding".

In some embodiments, the UEs 106/107 may include separate transmit and/or receive chains (e.g., including separate antennas and other radio components) for each wireless communication protocol with which it is configured to communicate. As a further possibility, the UEs 106/107 may include one or more radios that are shared between multiple wireless communication protocols, and one or more radios that are used exclusively by a single wireless communication protocol. For example, one or more of the UEs 106/107 may include a shared radio for communicating using either of LTE or NR, and separate radios for communicating using each of Wi-Fi and BLUETOOTH™. Other configurations are also possible.

In some embodiments, the UEs 106/107 may include an accessory device 107 and a companion device 106. In some embodiments, such an accessory device 107 may be capable of communicating with the companion device 106, which may also be referred to as a proxy device or intermediate device, using a short range communications protocol; for example, the accessory device 107 may according to some embodiments be "paired" with the companion device 106. Under some circumstances, the accessory device may use the cellular functionality of this proxy device 106 for communicating cellular voice/data with the base station 102 and/or to an access point. In other words, the accessory device 107 may provide voice/data packets intended for a base station or access point over the short range link to the companion device 106, and the companion device 106 may use its cellular or Wi-Fi functionality to transmit (or relay) this voice/data to the base station/access point on behalf of the accessory device 107. Similarly, the voice/data packets transmitted by the base station/access point and intended for the accessory device 107 may be received by the cellular/Wi-Fi functionality of the companion device 106 and then may be relayed over the short range link to the accessory device 107.

At least in some instances, such an accessory device 107 may also or alternatively selectively utilize one or the other of cellular or Wi-Fi communication capability to communicate directly with a cellular base station or a Wi-Fi access point, e.g., even if both options may be available. For example, if both wireless link options are available and are capable of providing the communication services currently desired by the accessory device 107, the accessory device 107 might prioritize the Wi-Fi link, e.g., to potentially reduce device power consumption and/or if the Wi-Fi link is considered to have a lower economic cost. The companion device 106 and/or the accessory device 107 may manage the wireless connectivity of the accessory device 107 in accordance with any of a variety of additional or alternative considerations at various times.

Figure 3:
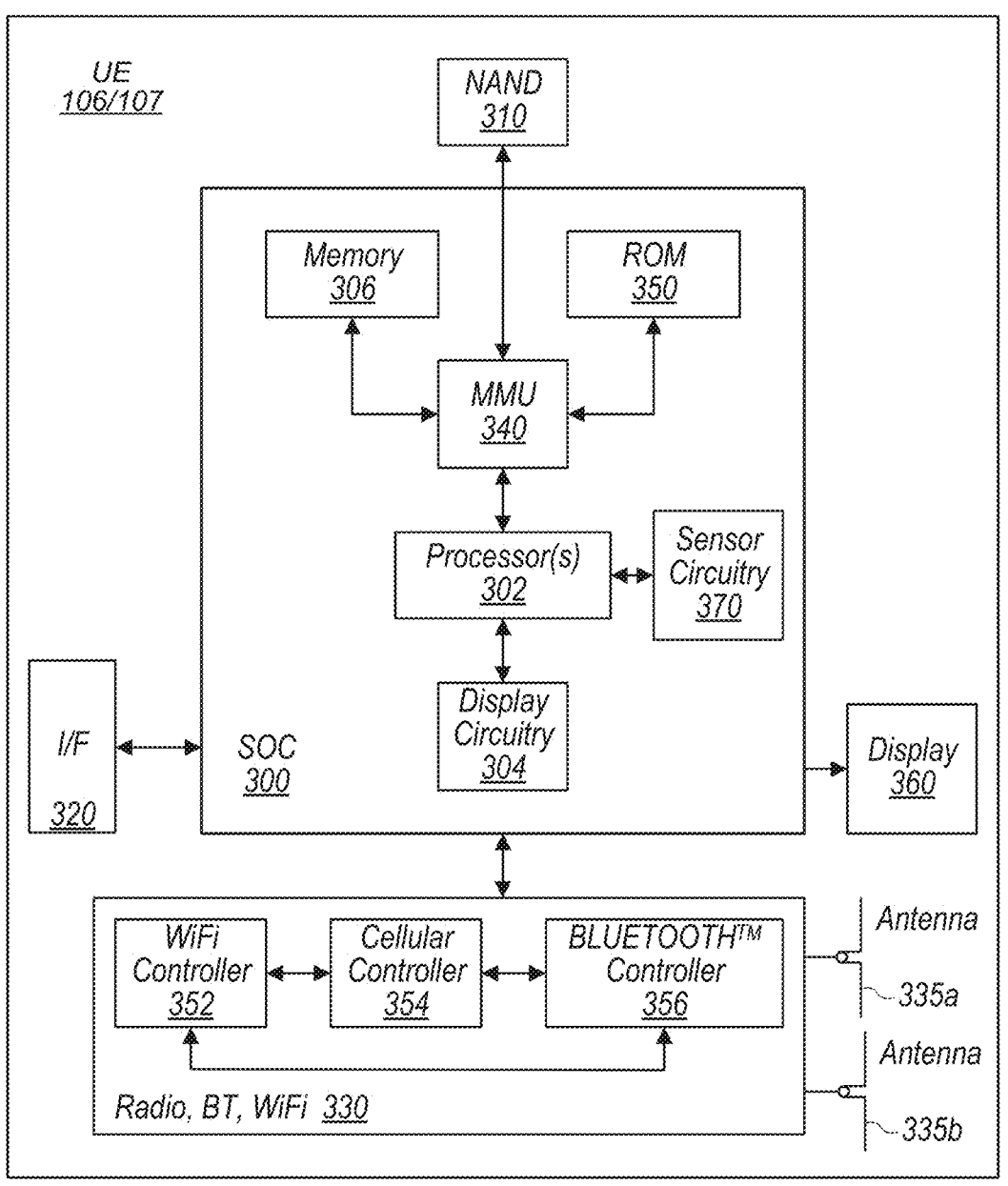
FIG. 3 illustrates an exemplary block diagram of a UE, according to some embodiments.

FIG. 3—Block Diagram of an Exemplary UE Device

FIG. 3 illustrates a block diagram of an exemplary UE device, such as UE 106 or 107, according to some embodiments. As shown, the UE 106/107 may include a system on chip (SOC) 300, which may include portions for various purposes. Some or all of the various illustrated components (and/or other device components not illustrated, e.g., in variations and alternative arrangements) may be "communicatively coupled" or "operatively coupled," which terms may be taken herein to mean components that can communicate, directly or indirectly, when the device is in operation.

As shown, the SOC 300 may include processor(s) 302 which may execute program instructions for the UE 106/107 and display circuitry 304 which may perform graphics processing and provide display signals to the display 360. The SOC 300 may also include sensor circuitry 370, which may include components for sensing or measuring any of a variety of possible characteristics or parameters of the UE 106/107. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106/107. Any of various other possible types of sensor circuitry may also or alternatively be included in UE 106/107, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, NR, BLUETOOTH™, Wi-Fi, NFC, GPS, etc.). The UE device 106/107 may include or couple to at least one antenna (e.g., 335 a), and possibly multiple antennas (e.g., illustrated by antennas 335 a and 335 b), for performing wireless communication with base stations and/or other devices. Antennas 335 a and 335 b are shown by way of example, and UE device 106/107 may include fewer or more antennas. Overall, the one or more antennas are collectively referred to as antenna 335. For example, the UE device 106/107 may use antenna 335 to perform the wireless communication with the aid of radio circuitry 330. The communication circuitry may include multiple receive chains and/or multiple transmit chains for receiving and/or transmitting multiple spatial streams, such as in a multiple-input multiple output (MIMO) configuration. As noted above, the UE 106/107 may be configured to communicate wirelessly using multiple wireless communication standards in some embodiments.

The UE 106/107 may include hardware and software components for implementing methods for the UE 106/107 to perform techniques for determining and presenting an indication of a closest cellular service location in a wireless communication system, such as described further subsequently herein. The processor(s) 302 of the UE device 106/107 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for determining and presenting an indication of a closest cellular service location in a wireless communication system according to various embodiments disclosed herein. Processor(s) 302 may also implement various other applications and/or end-user applications running on UE 106/107.

In some embodiments, radio 330 may include separate controllers dedicated to controlling communications for various respective RAT standards. For example, as shown in FIG. 3, radio 330 may include a Wi-Fi controller 352, a cellular controller 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106/107.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
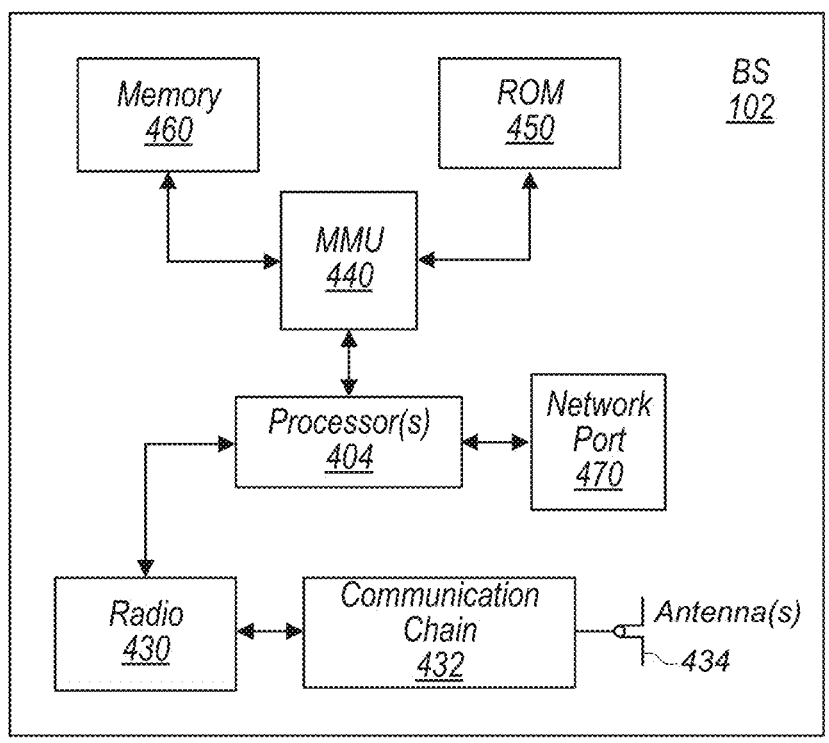
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106/107. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transmission and reception points (TRPs). In addition, a UE capable of operating according to 5G NR may be connected to one or more TRPs within one or more gNBs.

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, 5G NR, 5G NR SAT, LTE, LTE-A, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, 5G NR SAT and Wi-Fi, LTE and Wi-Fi, etc.).

As described further subsequently herein, the BS 102 may include hardware and software components for implementing or supporting implementation of features described herein. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network(s), e.g., it may include at least one Ethernet port, and radio 430 may be designed to communicate according to the Wi-Fi standard.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
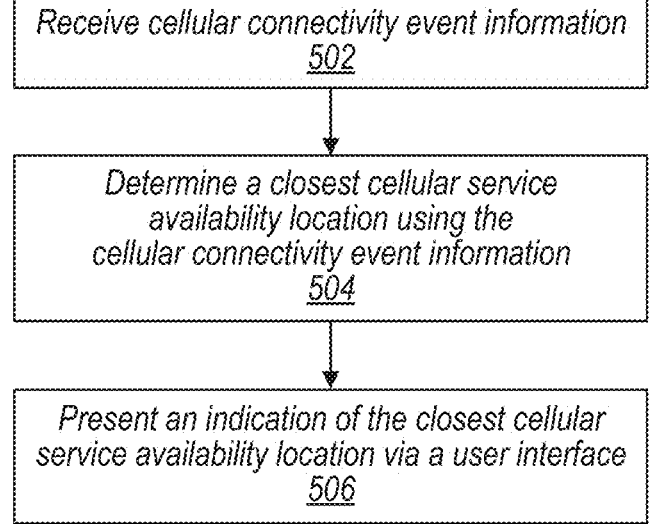
FIG. 5 is a flowchart diagram illustrating aspects of an exemplary possible method for determining and presenting an indication of a closest cellular service location in a wireless communication system, according to some embodiments.

FIG. 5—Determining and Presenting an Indication of a Closest Cellular Service Location While cellular networks may provide cellular service in many locations, there may continue to be locations in which cellular service is not available, for example including in remote areas and/or areas with natural features that obstruct provision of cellular service, in case of scheduled maintenance or emergency service outages for cellular network infrastructure equipment, and/or for any of various other reasons. When cellular service is not available for a wireless device, it may be useful to provide information on possible nearby locations at which cellular service may be available for the wireless device, for example in case a user of the wireless device is interested in using the cellular communication capabilities of the wireless device.

Thus, it may be beneficial to specify techniques for a wireless device to determine and present an indication of a closest cellular service location. To illustrate one such set of possible techniques, FIG. 5 is a flowchart diagram illustrating a method for determining and presenting an indication of a closest cellular service location in a wireless communication system, at least according to some embodiments.

Aspects of the method of FIG. 5 may be implemented by a wireless device, e.g., in conjunction with one or more cellular base stations, such as a UE 106/107 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

The wireless device may establish a wireless link with a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology, according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

In 502, the wireless device may receive cellular connectivity event information. The cellular connectivity event information may include either or both of information that is generated by the wireless device itself or information that is received from a paired wireless device. For example, in some embodiments, an accessory wireless device may be paired with a companion wireless device, and the wireless device implementing the method of FIG. 5 may be either the accessory wireless device or the companion wireless device. When the accessory wireless device is operating in stand-alone mode, it may be the case that the accessory wireless device generates the cellular connectivity event information based on its own cellular connectivity events. When the accessory wireless device is operating in paired mode with the companion wireless device acting as the primary device, it may be the case that the companion wireless device generates cellular connectivity event information based on its own cellular connectivity events and provides the cellular connectivity event information to the accessory wireless device. In this scenario, it may be the case that the accessory wireless device does not generate cellular connectivity event information while the companion wireless device is acting as the primary device in the pairing. It may be the case that the companion wireless also generates cellular connectivity event information based on its own cellular connectivity events when operating in standalone mode.

Thus, the cellular connectivity event information received by the wireless device could include both internally generated cellular connectivity event information and cellular connectivity event information received from a paired companion wireless device (e.g., if the wireless device operates as a standalone wireless device some of the time and is paired with a companion wireless device acting as the primary device in the pairing some of the time), or could include only internally generated cellular connectivity event information (e.g., if the wireless device only operates in standalone mode or as the primary device in a pairing with an accessory device), or could include only cellular connectivity event information received from a paired companion wireless device (e.g., if the wireless device only operates in a pairing with a companion wireless device that acts as the primary device in the pairing), according to various embodiments.

Note that in scenarios in which cellular connectivity event information is provided from one wireless device to another wireless device, there may be multiple possible mechanisms for performing the information transfer, potentially including a push-based data transfer mechanism or a pull-based data transfer mechanism. It should also be noted that it may be the case that such data transfer is only performed in accordance with user permission and entitlements, for example in scenarios in which the paired wireless devices are associated with a same user account with a device vendor for the wireless devices, or with another entity capable of handling at least some aspects of user privacy/security/etc. for the wireless devices. Such data transfer may be performed periodically/regularly, and/or aperiodically, such as in response to a specific request for cellular connectivity event information from an accessory wireless device to a paired companion wireless device, according to various embodiments.

The cellular connectivity event information may include any of various possible information for one or more cellular connectivity events. Each cellular connectivity event may relate to a change in cellular service availability status. In some instances, the cellular connectivity event information may indicate, for each cellular connectivity event, a timestamp for the cellular connectivity event (e.g., a time at which the change in cellular service availability status occurred), a cellular service availability status before the cellular connectivity event (e.g., the cellular service availability status before the change in cellular service availability status), and a cellular service availability status after the cellular connectivity event (e.g., the cellular service availability status after the change in cellular service availability status). In some embodiments, the cellular connectivity event information may indicate an associated location for each cellular connectivity event. In other words, it may be the case that the location of the wireless device at the time of a change in cellular service availability status may be determined when the cellular connectivity event for that change in cellular service availability status is generated, and an indication of that location may be included in the cellular connectivity event information for the cellular connectivity event. Alternatively, it may be the case that location information is not included when generating the cellular connectivity event information, though as described subsequently herein, it may still be possible to estimate the location of the wireless device at the time of the change in cellular service availability status for a cellular connectivity event, e.g., at a later time. Note that any number of additional or alternative fields (e.g., relating to cellular connectivity events) could be included in the cellular connectivity event information, according to various embodiments.

The cellular service availability status of the wireless device that is generating the cellular connectivity event information may be determined/selected from any of a variety of possible cellular service availability statuses, according to various embodiments. In some embodiments, the cellular service availability statuses may be selected from a set of possible cellular service availability statuses that includes some or all of an in-service status, an emergency-service status, a no-service status, or an airplane mode status. An unknown status could also be available. In some embodiments, more finely grained cellular service availability statuses may be available to choose from, for example potentially including further information regarding any or all of signal strength/quality availability, radio access technology availability, voice service availability, data service availability, other specific service availability, estimated bandwidth availability, Quality of Service (QOS) availability, whether service availability is home- or roaming service, etc.

Additionally, the cellular service availability status of the wireless device that is generating the cellular connectivity event information may be determined in any of a variety of possible ways, according to various embodiments. In some embodiments, the network registration status information for one or more subscriber identity modules (SIMs) of the wireless device may be determined, and the cellular connectivity event information may be generated based at least in part on the network registration status information for the SIM(s) of the wireless device. For example, an indication may be provided from a baseband domain of the wireless device when the network registration status for a SIM of the wireless device changes, based on which cellular connectivity event information may be generated for a cellular connectivity event associated with the change in network registration status for the SIM of the wireless device. In case of a multi-SIM wireless device, it may be the case that a combined network registration status for the multiple SIMs of the wireless device is determined, e.g., using network registration status information for each of the multiple SIMs of the wireless device. This may prevent excessive and/or inaccurate generation of cellular connectivity event, for example in scenarios in which cellular service availability changes for one SIM of the wireless device but remains available for another SIM of the wireless device, at least according to some embodiments.

Note that there may be instances in which the wireless device operates in a low power mode, e.g., in which baseband operations are voluntarily suspended for at least a portion of the time in order to conserve battery power. In such a scenario, it may be the case that the wireless device does not generate a cellular connectivity event indicating a change to no-service based on the voluntarily suspension of baseband activity, at least in some embodiments. This may avoid mischaracterization of scenarios in which the wireless device is not actually out of service while the baseband has been turned off to conserve battery, at least in some scenarios.

In some embodiments, it may be the case that cellular connectivity event information generated or received by a wireless device is stored for a limited amount of time (e.g., several days, a week, or a month, as various possibilities) before being discarded. This may help reduce the memory required to store the information as well as ensure that the cellular connectivity event information stored by the wireless device is more likely to be relevant and not outdated, at least according to some embodiments.

In 504, the wireless device may determine (e.g., estimate) a closest cellular service availability location using the cellular connectivity event information. At least in some embodiments, this determination may be performed based at least in part on the wireless device not having cellular service available. Alternatively, this determination may be performed when limited service (emergency service only, roaming service only, or otherwise limited service) is available. The closest cellular service availability location may be a closest location that is estimated to have any cellular service availability (e.g., including limited cellular service availability, such as only emergency service availability), or may be a closest location that is estimated to have a specific type of cellular service availability (e.g., 5G availability, high bandwidth capability, etc.), or may be a closest location that is estimated to have full/normal cellular service availability, among various possibilities. In some embodiments, multiple closest cellular service availability locations may be determined; for example, for a wireless device that is in no-service, it may be the case that a closest emergency cellular service availability location is determined, and also that a closest normal cellular service availability location is determined.

The closest cellular service availability location may be selected from one or more possible cellular service availability locations that are determined based at least in part on the cellular connectivity event information, in some embodiments. For example, the cellular connectivity event information may provide information indicating when (any or a specific type of) cellular service was most recently available, and possibly information indicating one or more previous occasions when cellular service was available. If the cellular connectivity event information includes associated location information for cellular connectivity events, this associated location information may be used to determine which of the locations at which cellular service was previously available is closest to the current location of the wireless device. Alternatively (e.g., if the cellular connectivity event information does not include associated location information for cellular connectivity event), the wireless device may use location history information for the wireless device to determine a location of the wireless device at the timestamp of the cellular connectivity event for (e.g., some or all of) the cellular connectivity events, and correspondingly to determine one or more locations at which cellular service may be available for the wireless device.

Note that the location information may include any of a variety of types of location information and may have any of a variety of possible granularity or precision levels. In some embodiments, the location information may include latitude and longitude coordinate information, which may be tracked for the wireless device using a global navigational satellite system (GNSS) capability such as global positioning system (GPS). In some embodiments, the location information may include elevation information for the wireless device. Such information may be used to more accurately determine the closest cellular service availability location to the wireless device than if using latitude and longitude coordinate information alone, in some instances. For example, in a scenario in which the closest cellular service availability location by latitude and longitude coordinates is at a sufficiently different elevation than the current location of the wireless device, it could be possible that another cellular service availability location that is further from the current location of the wireless device by latitude and longitude coordinates but closer in elevation is closer overall. As a still further possibility, in some instances, it may be possible that one or more topographical features could be considered when determining the closest cellular service availability location. For example, if topographical information available at the wireless device indicates that a feature having a significantly higher elevation (e.g., a mountain, as one possibility) or a significantly lower elevation (e.g., a canyon, as one possibility) is present between the current location of the wireless device and a possible cellular service availability location, the wireless device could be configured to consider such information when determining which cellular service availability location is considered the closest cellular service availability location to the wireless device.

In some embodiments, it may also or alternatively be possible that the closest cellular service availability location can be selected based at least in part on crowdsourced cellular connectivity event information. For example, anonymized cellular connectivity event information could be collected and aggregated to estimate possible cellular service locations in certain areas (e.g., areas that include locations in which cellular service may not be available), and such information (e.g., a coverage map) could be provided (e.g., pre-provisioned, or obtained via another wireless communication mechanism, such as a Wi-Fi connection) to wireless devices to assist with determination of the closest cellular service availability location. As one possibility, such information could be used by a wireless device that is in low-power mode or airplane mode and does not have cellular service (e.g., due to voluntarily reducing baseband operations to conserve battery), to estimate whether cellular service is likely to be available at the current location of the wireless device, and/or to estimate a closest cellular service availability location for the wireless device.

In 506, the wireless device may present an indication of the closest cellular service availability location via one or more user interface elements. Note that if multiple closest cellular service availability locations are determined (e.g., including the closest cellular service availability locations for each of multiple types of cellular service, such as the closest emergency cellular service availability location, the closest cellular data service availability location, etc.), an indication may be presented for each of these cellular service availability locations. Note that it may be the case that the closest cellular service availability location is different than a most recent cellular service availability location.

The indication may include any (and possibly multiple) of numerous possible types of indications. In some embodiments, the indication may include a pin or other visual indicator displayed on a map or compass display, for example to indicate the latitude and longitude coordinates, the direction, and/or the distance from the current location of the wireless device to the closest cellular service availability location. As another possibility, a textual indication of the latitude and longitude coordinates, the direction, and/or the distance from the current location of the wireless device to the closest cellular service availability location could be provided. As still another possibility, an audio indication could be rendered by a virtual assistant operating on the wireless device (e.g., the virtual assistant could speak the coordinates, direction, and/or distance from the current location of the wireless device). In some embodiments, it may be possible that different kinds of indications could be provided based on the confidence level (e.g., at the telephony layer) in finding cellular service at the indicated location. For example, an indication that cellular service is available "nearby" could be provided when the wireless device reaches (e.g., is within a configured threshold distance of) the indicated location (i.e., the location from the user's history known to have cellular availability in the past), and an indication that the user as "arrived" could be provided when the telephony layer has cellular service available to make a cellular (or possibly at least emergency) call or otherwise obtain cellular service successfully. Other types of indications are also possible.

Additionally, the indication may be provided in response to any of a variety of possible triggers. As one possibility, the indication may be provided in response to user input explicitly requesting an indication of the closest cellular service availability location. As another possibility, the indication may be provided in response to user input initiating an application or activity that would make use of cellular service when cellular service is not available. Other triggers for providing the indication of the closest cellular service availability location are also possible.

Note that similar techniques could be used to determine and present indications of any number of types of cellular service availability locations, e.g., as variations on or alternatives to the closest cellular service availability location. As one such example, one or more most recent cellular service availability locations (e.g., potentially including the most recent cellular service availability locations for each of multiple types of cellular service) could additionally or alternatively be determined, and indications thereof presented, in a similar manner as for the closest cellular service availability location(s), at least according to some embodiments.

Thus, at least according to some embodiments, the method of FIG. 5 may be used by a wireless device, or potentially by a paired companion wireless device and accessory wireless device, to determine where to find cellular service when no or limited cellular service is available. This may be helpful to users in areas with uncertain cellular service availability, and possibly more generally to users looking to obtain a specific type of cellular service that is not available even if some types of cellular services are available, at least in some instances.

FIGS. 6-11 and Additional Information

FIGS. 6-11 illustrate further aspects that might be used in conjunction with the method of FIG. 5 if desired. It should be noted, however, that the exemplary details illustrated in and described with respect to FIGS. 6-11 are not intended to be limiting to the disclosure as a whole: numerous variations and alternatives to the details provided herein below are possible and should be considered within the scope of the disclosure.

In scenarios in which cellular service is not available to a wireless device, it may be useful to identify and provide information about nearby locations at which cellular service may be available. For example, if a user is hiking in a wilderness area, information regarding possible locations at which normal cellular service may be available could be useful for helping the user determine in which direction to travel to be able to check messages or make a call. In case of emergency, similarly, information regarding possible locations at which emergency cellular service may be available could be useful for helping the user determine in which direction to travel to be able to make an emergency call. Accordingly, techniques are described herein for various techniques for identifying, and providing an indication via a user interface (e.g., at least under certain circumstances, such as if requested by user input, and/or triggered by one or more other configured triggers for providing such an indication), of one or more possible (e.g., nearby) locations at which cellular service may be (e.g., is known or estimated to be) available.

When cellular service is not available for a wireless device, there may be multiple possible approaches for identifying a nearby location at which cellular service may be available. One such approach may include determining the location at which cellular service was most recently available to the wireless device, which may commonly be nearby. Another such approach may include determining the closest location at which cellular service was available to the wireless device, potentially including comparing how far away the wireless device is from both the location at which cellular service was most recently available to the wireless device and one or more locations at which cellular service was available to the wireless device previous to that. In some instances, such an approach may identify a location at which cellular service may be available to the wireless device that is closer in terms of physical distance than the location at which cellular service was most recently available to the wireless device.

Figure 6:
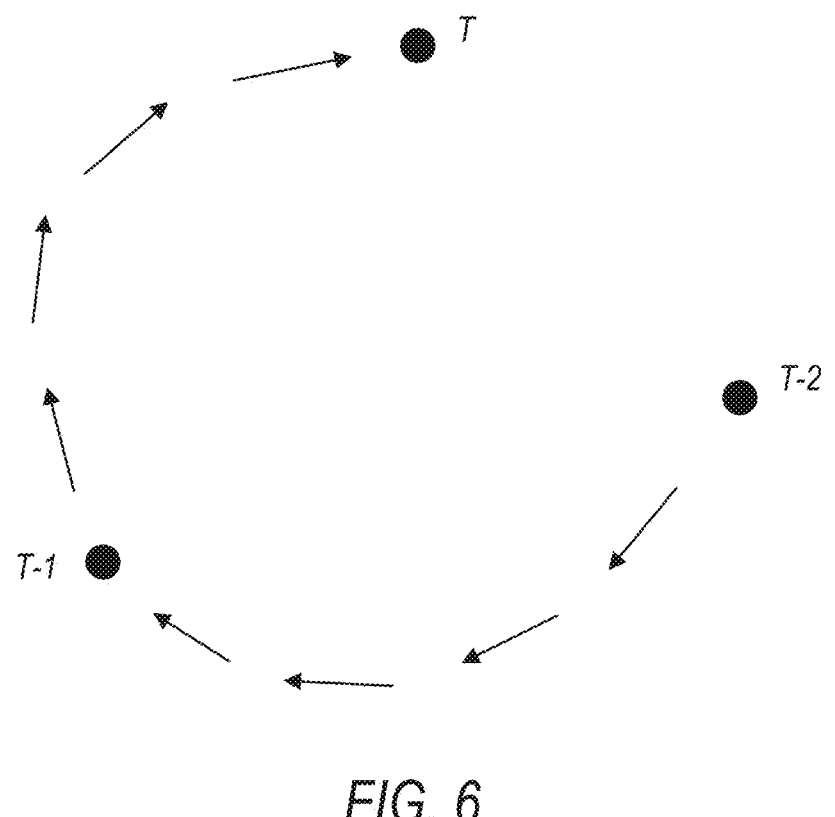
FIG. 6 is a diagram illustrating aspects of an example scenario in which the closest location at which cellular service is available to a wireless device is not the most recent location at which cellular service was available to a wireless device.

FIG. 6 is a diagram illustrating aspects of an example scenario in which this could occur. As shown, in the illustrated scenario, a wireless device (e.g., which may be carried or worn by a user) may travel with approximately circular movement from an earliest time T-2, through an intermediate time T-1, until a current time T. Such a scenario could occur, for example, if the user were hiking along a loop trail, among various other possibilities. In the illustrated scenario, the wireless device may have had cellular service available at both T-1 and T-2, but does not currently have cellular service available. Although the wireless device most recently had cellular service availability at T-1, the location of the wireless device at T-2 may be closer to the current location of the wireless device.

Identifying the most recent and/or closest cellular service availability location(s) for a wireless device may include making use of historical cellular connectivity information for the wireless device itself, and/or for a companion device that is capable of obtaining cellular connectivity, in some embodiments. As a still further possible approach, in some embodiments, it may be possible to use estimated cellular service availability location information from aggregated crowd-sourced information to determine a closest cellular service availability location.

Note that the cellular service availability location(s) identified and indicated by a wireless device could include either or both of emergency cellular service availability locations or normal cellular service availability locations.

Thus, in various embodiments, it may be possible to identify and indicate any or all of a most recent known or estimated normal cellular service availability location, a most recent known or estimated emergency cellular service availability location, a closest known or estimated normal cellular service availability location, and/or a closest estimated emergency cellular service availability location. Note that in various scenarios, it may be possible that multiple (and possibly all) of these conditions are met by the same location, or that different locations are identified as meeting each of these conditions. At least in some embodiments, providing more options may give more flexibility to a user to decide their preferred option based on their circumstances.

In order to identify such locations, it may be the case that a wireless device is configured to monitor cellular availability changes on the device, and record them (e.g., write/log events) as they occur. For example, the events could include information such as the previous and current device registration status, device type, and timestamp at which the state transition occurred. In some embodiments, the events could also include location information (e.g., latitude/longitude) for identifying a location at which the cellular availability change occurred. The registration status could be selected from a set of configured options, such as data available, emergency voice only, airplane mode, or no connection, among various possibilities. These events may be recorded by a cellular or wireless connection manager entity, or by any of various other possible entities operating on the wireless device, according to various embodiments.

These events may be relayed internally (and/or possibly externally, for example to a companion or accessory device paired with the wireless device), for example to an application capable of presenting information to a user via one or more user interface elements. The recipient (e.g., application) may use the information to determine which location(s) to present indication(s) identifying via one or more user interface elements. Such indication(s) may be presented when a cellular event switches from a registration status considered adequately available to unavailable, and/or based on any of various other possible triggers. Similarly, such indication(s) may no longer be presented when a cellular event switches from a registration status considered unavailable to adequately available, and/or based on any of various other possible triggers.

Note that an indication of a most recent or closest cellular service location could potentially be provided by any of a variety of possible applications executing on the wireless device. For example, such an indication could be provided by a compass or maps application (e.g., to assist a user actively navigating), and/or by any of various other applications that make use of cellular connectivity (e.g., in response to a user attempting to use the application for cellular connectivity when no cellular service is available), potentially including voice and video calling applications, web browser applications, game applications, music or video streaming applications, social media applications, etc.

FIGS. 7-10 illustrate example aspects of various possible ways in which a compass application could provide an indication, according to various embodiments. As shown in FIG. 7, as one possibility, a visual indication may be overlayed on a compass display, which may show approximate distance and direction from the current location of the wireless device to the closest or most recent cellular service location. FIG. 8 illustrates use of a similar visual indication that is overlayed on a compass display, which may show approximate distance and direction from the current location of the wireless device to the closest or most recent emergency (SOS) cellular service location. FIG. 9 illustrates a possible textual display of the most recent (last) normal and emergency cellular service locations, including displaying latitude and longitude coordinates for those locations. Such a textual display could be used directly by the user and/or could be used to select an indicator to display on a compass overlay, such as in one of FIG. 7 or 8. FIG. 10 illustrates a further possible display screen that provides options for a user to select a location indicator to display on a compass overlay (such as in FIG. 7 or 8) and/or to select a location about which to provide more information (such as in FIG. 9).

Numerous other types of user interface options are also possible. As some examples, an application could provide a visual indication on a map overlay, provide an audio indication (e.g., including an audible indication of the latitude and longitude coordinates of the closest or most recent cellular service location, an audible indication of the direction and distance to the closest or most recent cellular service location, etc.), a textual notification generated in response to user activity that requires cellular service (e.g., attempting to initiate a voice call, as one possibility), and/or any of various other types of indication.

Note that, at least in some embodiments, it may be possible to provide user control over which applications on the wireless device are able to receive event information and/or associated location information related to cellular service availability, e.g., in accordance with their privacy preferences.

Monitoring and recording cellular availability changes for a wireless device may be performed in any of various ways. In some embodiments, the cellular availability monitoring and recording may be performed in a manner that considers a variety of possible conditions and scenarios in such a way as to write events that more accurately reflect when cellular service is and is not available to the wireless device. Such conditions and scenarios could include the use of a low power mode (e.g., in which the baseband may be deliberately turned off to save battery), a device having multiple subscriber identity modules (SIMs), such as a dual-SIM phone, a device having a companion device that may or may not be capable of connecting to a cellular network (e.g., a smart watch that is paired with a smart phone), use of an airplane mode (e.g., in which cellular service may manually be disabled regardless of its availability), among various possibilities.

Figure 11:
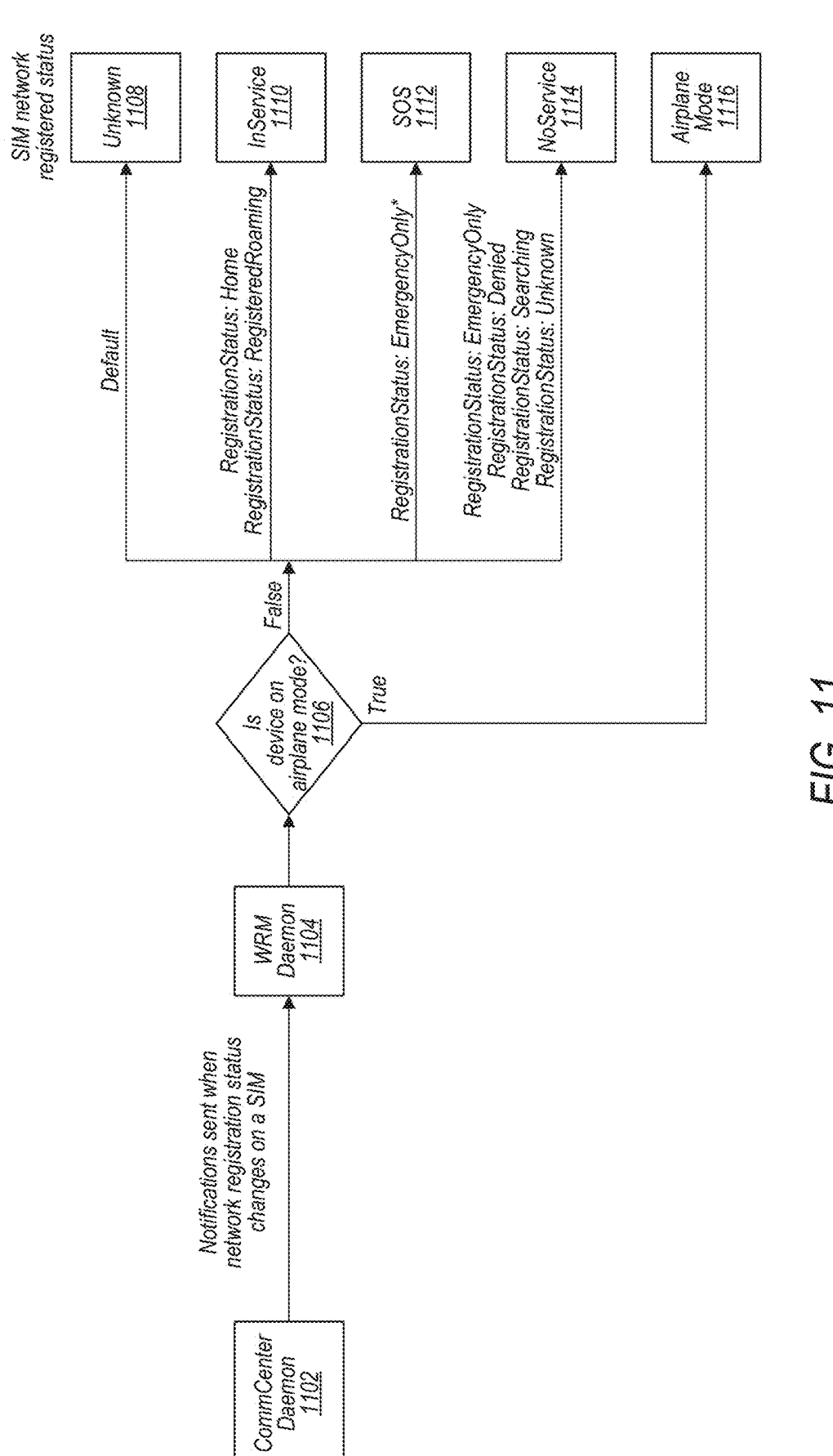
FIG. 11 is a flowchart diagram illustrating one possible example approach to determining the network registered status for a subscriber identity module of a wireless device, according to some embodiments.

FIG. 11 is a flowchart diagram illustrating one possible example approach to determining the SIM network registered status for a SIM of a wireless device, according to some embodiments. In the illustrated scenario, a communications center ("CommCenter") daemon 1102 may provide notifications to a wireless radio manager ("WRM") daemon 1104 when network status changes on a SIM of the wireless device. In 1106, the WRM daemon may determine whether the device is on airplane mode. If so, the WRM daemon may determine that the SIM network registered status is airplane mode 1116. If not, as a default, the SIM network registered status may be unknown 1108. If the registration status is 'Home' or 'RegisteredRoaming', the SIM network registered status may be in-service 1110. If the registration status is 'EmergencyOnly', and an SOS user interface is available in the location (e.g., country) of the wireless device, the SIM network registered status may be SOS 1112. If the registration status is 'EmergencyOnly', and an SOS user interface is not available in the location of the wireless device, or if the registration status is 'Denied', 'Searching', or 'Unknown', the SIM network registered status may be no service 1114.

For a multi-SIM device, it may be the case that the SIM network registered status for each of the SIMS is considered to determine the device network registration status. In some embodiments, for example, it may be the case that if any of the SIMS are in airplane mode (e.g., if the device is in the airplane mode), the device network registration status may be considered airplane mode. If at least one SIM is in service, it may be the case that the device network registration status is in service. If none of the SIMs are in service and at least one SIM is in SOS, it may be the case that the device network registration status is SOS. If none of the SIMs are in service or SOS and at least one SIM is in no service, it may be the case that the device network registration status is no service. If all SIMs are in unknown, it may be the case that the device network registration status is unknown. Thus, as an example, if a user has two SIMs belonging to different carriers, and if there are frequent availability transitions on one SIM while the other has data available the entire time, it may be the case that no events are written. Note that other device network registration status mappings from SIM network registered statuses for multiple SIMs of a wireless device are also possible.

As previously noted, it may be the case that the wireless device can record changes in the device network registration status. This may include writing events to an internal data stream when the current device network registration status is different from the previous status. In a scenario with paired devices, it may be the case that only the primary device writes these device network registration status change events at any given time. As an example, for a paired phone and watch, it could be the case that the phone is considered the primary device while the watch is paired to the phone, but also that the watch can be considered the primary device when operating in a standalone mode.

As also previously noted, it may be possible to include location information (e.g., latitude and longitude of the wireless device when the event occurred) with such events, for example to increase accuracy and decrease latency for applications making use of the internal data stream to present an indication of the closest or most recent cellular service availability location. Alternatively, such events may not include location information, in which case applications making use of the internal data stream to present an indication of the closest or most recent cellular service availability location may separately obtain location information for the time(s) of the event(s) in the internal data stream to associate location information with those events in order to present an indication of the closest or most recent cellular service availability location. Such an approach may potentially have a cost in terms of accuracy and latency, but may allow for more precise control/implementation of the user's privacy preferences with respect to which information is available to which application on the wireless device.

Note that in the case of paired or otherwise associated devices, it may be the case that these events can be fetched from one device to another via the internal data stream, e.g., provided that appropriate entitlements are in place (e.g., the devices are both associated with the same user account and the user has explicitly authorized such transfer, as one possibility).

In some embodiments, it could be possible that the device registration status list could include any of various additional or alternative information; for example, the list of possible statuses could be augmented to account for different cellular quality metrics, statuses such as roaming, voice only, etc., could be supported, and so on.

For devices operating in low power mode, it may be the case that baseband is deliberately turned off to save battery for some or all of the time. For example, in such a mode, it could be the case that a device connects to cellular service once per hour for two minutes, and that baseband remains off for the rest of the time unless an application that requires a data connection is deliberately launched by the user. Thus, at least in some embodiments, it may be beneficial to avoid writing 'no connection' or 'no service' events when the device is manually switched into the low power mode as the device may generally not be out of service, but rather simply with baseband turned off to conserve battery.

In some instances, in such a low power mode and/or at other times, it may be possible that crowdsourced/harvested (e.g., with user consent) information from other wireless device can be leveraged to estimate cellular availability locations. For example, device network registration status change events could be aggregated by a device vendor or network operator to identify one or more estimated cellular service availability locations near a wireless device while the wireless device is in low power mode, in some embodiments. Such cellular service availability locations could be estimated using information from devices of a same type as the wireless device, or from a broader group of wireless devices, according to various embodiments.

In the following further exemplary embodiments are provided.

One set of embodiments may include a method, comprising: by a wireless device: receiving cellular connectivity event information; determining a closest cellular service availability location for the wireless device based at least in part on the cellular connectivity event information; and presenting an indication of the closest cellular service availability location via one or more user interface elements, wherein the closest cellular service availability location is different than a most recent cellular service availability location.

According to some embodiments, the cellular connectivity event information indicates, for each cellular connectivity event of one or more cellular connectivity events: a timestamp for the cellular connectivity event; a cellular service availability status before the cellular connectivity event; and a cellular service availability status after the cellular connectivity event.

According to some embodiments, the cellular connectivity event information further indicates, for each cellular connectivity event of the one or more cellular connectivity events: an associated location for the cellular connectivity event.

According to some embodiments, the method further comprises: receiving location history information for the wireless device; and determining, for each cellular connectivity event of the one or more cellular connectivity events, a location of the wireless device at the timestamp for the cellular connectivity event.

According to some embodiments, the method further comprises: receiving network registration status information for a first subscriber identity module (SIM) of the wireless device; and generating the cellular connectivity event information based at least in part on the network registration status information for the first SIM of the wireless device.

According to some embodiments, the method further comprises: receiving network registration status information for a second subscriber identity module (SIM) of the wireless device; and generating the cellular connectivity event information further based at least in part on the network registration status information for the second SIM of the wireless device.

According to some embodiments, generating the cellular connectivity event information is further based at least in part on whether the wireless device is in one of a low power mode or an airplane mode.

According to some embodiments, the method further comprises: determining that the wireless device and a companion wireless device are paired wireless devices; determining that the companion wireless device is a primary device of the paired wireless devices; receiving the cellular connectivity event information from the companion wireless device based at least in part on the companion wireless device being the primary device of the paired wireless devices; and determining to not generate cellular connectivity event information based at least in part on the companion wireless device being the primary device of the paired wireless devices.

Another set of embodiments may include a wireless device, comprising: an antenna; a radio coupled to the antenna; and a processor operably coupled to the radio; wherein the wireless device is configured to: receive cellular connectivity event information; determine one or more possible cellular service availability locations based at least in part on the cellular connectivity event information; determine a closest cellular service availability location among the one or more possible cellular service availability locations; and present an indication of the closest cellular service availability location via one or more user interface elements, wherein the closest cellular service availability location is different than a most recent cellular service availability location.

According to some embodiments, the cellular connectivity event information indicates, for each of one or more cellular connectivity events: a timestamp at which a change in cellular service availability status occurred; a cellular service availability status before the change in cellular service availability status; and a cellular service availability status after the change in cellular service availability status.

According to some embodiments, the cellular service availability statuses are selected from a set of possible cellular service availability statuses that includes at least: in service; emergency service; no service; and airplane mode.

According to some embodiments, the wireless device is further configured to: receive network registration status information for one or more subscriber identity modules (SIMs) of the wireless device; and generate the cellular connectivity event information based at least in part on the network registration status information for the one or more SIMs of the wireless device.

According to some embodiments, the wireless device is further configured to: determine that the wireless device is in a low-power mode with no cellular service; and estimate whether cellular service is available in a current location of the wireless device using crowdsourced cellular connectivity event information based at least in part on the wireless device being in the low-power mode with no cellular service.

According to some embodiments, the wireless device is further configured to: establish a wireless link with a companion wireless device; and receive the cellular connectivity event information from the companion wireless device via the wireless link with the companion wireless device.

Yet another set of embodiments may include an apparatus, comprising: a processor configured to cause a wireless device to: determine network registration status information for one or more subscriber identity modules (SIMs) of the wireless device; generate cellular connectivity event information based at least in part on the network registration status information for the one or more SIMs of the wireless device; determine that the wireless device does not have cellular service available; estimate a closest cellular service availability location based at least in part on the cellular connectivity event information; and present an indication of the closest cellular service availability location via one or more user interface elements, wherein the closest cellular service availability location is different than a most recent cellular service availability location.

According to some embodiments, the cellular connectivity event information indicates, for each cellular connectivity event of one or more cellular connectivity events: a timestamp for the cellular connectivity event; a cellular service availability status before the cellular connectivity event; and a cellular service availability status after the cellular connectivity event.

According to some embodiments, the cellular service availability statuses are selected from a set of possible cellular service availability statuses that includes at least: in service; emergency service; no service; and airplane mode.

According to some embodiments, the cellular connectivity event information further indicates, for each cellular connectivity event of the one or more cellular connectivity events: an associated location for the cellular connectivity event.

According to some embodiments, the wireless device includes multiple SIMs, wherein the processor is further configured to cause the wireless device to: determine a combined network registration status for the multiple SIMs of the wireless device based at least in part on network registration status information for each of the multiple SIMs of the wireless device, wherein the cellular connectivity event information is generated based at least in part on the combined network registration status.

According to some embodiments, the processor is further configured to cause the wireless device to: establish a wireless link with an accessory wireless device; and provide the cellular connectivity event information to the accessory wireless device via the wireless link with the accessory wireless device.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:
by a wireless device:
determining network registration status information for one or more subscriber identity modules (SIMs) of the wireless device;
generating, based at least in part on the network registration status information for the one or more SIMs of the wireless device, cellular connectivity event information comprising respective location information and respective elevation information corresponding to respective cellular connectivity events;
determining that the wireless device does not have cellular service available;
estimating, based at least in part on the cellular connectivity event information, the respective location information, the respective elevation information, and estimated cellular service availability location information from crowd-sourced information aggregated from one or more other wireless devices, a closest cellular service availability location for the wireless device; and
presenting an indication of the closest cellular service availability location via one or more user interface elements, wherein the closest cellular service availability location is closer in terms of physical distance than a most recent cellular service availability location.

2. The method of claim 1,
wherein the cellular connectivity event information indicates, for each cellular connectivity event of one or more cellular connectivity events:
a timestamp for the cellular connectivity event;
a cellular service availability status before the cellular connectivity event; and
a cellular service availability status after the cellular connectivity event.

3. The method of claim 2,
wherein the cellular connectivity event information further indicates, for each cellular connectivity event of the one or more cellular connectivity events:
an associated location for the cellular connectivity event.

4. The method of claim 2, wherein the method further comprises:
receiving location history information for the wireless device; and determining, for each cellular connectivity event of the one or more cellular connectivity events, a location of the wireless device at the timestamp for the cellular connectivity event.

5. The method of claim 1, wherein generating the cellular connectivity event information is further based at least in part on whether the wireless device is in one of a low power mode or an airplane mode.

6. The method of claim 1, wherein the method further comprises:

determining that the wireless device and a companion wireless device are paired wireless devices;

determining that the companion wireless device is a primary device of the paired wireless devices;

receiving the cellular connectivity event information from the companion wireless device based at least in part on the companion wireless device being the primary device of the paired wireless devices; and determining to not generate the cellular connectivity event information based at least in part on the companion wireless device being the primary device of the paired wireless devices.

7. A wireless device, comprising:

an antenna;

a radio coupled to the antenna; and a processor operably coupled to the radio;

wherein the wireless device is configured to:

determine network registration status information for one or more subscriber identity modules (SIMs) of the wireless device;

generate, based at least in part on the network registration status information for the one or more SIMs of the wireless device, cellular connectivity event information comprising respective location information and respective elevation information corresponding to respective cellular connectivity events;

determine that the wireless device does not have cellular service available;

estimate, based at least in part on the cellular connectivity event information, the respective location information, the respective elevation information, and estimated cellular service availability location information from crowd-sourced information aggregated from one or more other wireless devices, a closest cellular service availability location; and present an indication of the closest cellular service availability location via one or more user interface elements, wherein the closest cellular service availability location is closer in terms of physical distance than a most recent cellular service availability location.

8. The wireless device of claim 7, wherein the cellular connectivity event information indicates, for each of one or more cellular connectivity events:

a timestamp at which a change in cellular service availability status occurred;

a cellular service availability status before the change in cellular service availability status; and a cellular service availability status after the change in cellular service availability status.

9. The wireless device of claim 8, wherein cellular service availability statuses are selected from a set of possible cellular service availability statuses that includes at least:

in service;

emergency service;

no service; and airplane mode.

10. The wireless device of claim 7, wherein the wireless device is further configured to:

determine that the wireless device is in a low-power mode with no cellular service; and estimate whether cellular service is available in a current location of the wireless device using crowdsourced cellular connectivity event information based at least in part on the wireless device being in the low-power mode with no cellular service, wherein the crowdsourced cellular connectivity event information is harvested with user consent.

11. The wireless device of claim 7, wherein the wireless device is further configured to:

establish a wireless link with a companion wireless device; and receive the cellular connectivity event information from the companion wireless device via the wireless link with the companion wireless device.

12. An apparatus, comprising:

a processor configured to cause a wireless device to:

determine network registration status information for one or more subscriber identity modules (SIMs) of the wireless device;

generate cellular connectivity event information based at least in part on the network registration status information for the one or more SIMs of the wireless device, wherein the cellular connectivity event information comprises respective location information and respective elevation information corresponding to respective cellular connectivity events;

determine that the wireless device does not have cellular service available;

estimate, based at least in part on the cellular connectivity event information, the respective location information, the respective elevation information, and estimated cellular service availability location information from crowd-sourced information aggregated from one or more other wireless devices, a closest cellular service availability location; and present an indication of the closest cellular service availability location via one or more user interface elements, wherein the closest cellular service availability location is closer in terms of physical distance than a most recent cellular service availability location.

13. The apparatus of claim 12, wherein the cellular connectivity event information indicates, for each cellular connectivity event of one or more cellular connectivity events:

a timestamp for the cellular connectivity event;

a cellular service availability status before the cellular connectivity event; and a cellular service availability status after the cellular connectivity event.

14. The apparatus of claim 13, wherein cellular service availability statuses are selected from a set of possible cellular service availability statuses that includes at least:

in service;

emergency service;

no service; and airplane mode.

15. The apparatus of claim 13, wherein the cellular connectivity event information further indicates, for each cellular connectivity event of the one or more cellular connectivity events:

an associated location for the cellular connectivity event.

16. The apparatus of claim 13, wherein the processor is further configured to cause the wireless device to:

receive location history information for the wireless device; and determine, for each cellular connectivity event of the one or more cellular connectivity events, a location of the wireless device at the timestamp for the cellular connectivity event.

17. The apparatus of claim 12, wherein generating the cellular connectivity event information is further based at least in part on whether the wireless device is in one of a low power mode or an airplane mode.

18. The apparatus of claim 12, wherein the processor is further configured to cause the wireless device to:

determine that the wireless device and a companion wireless device are paired wireless devices;

determine that the companion wireless device is a primary device of the paired wireless devices;

receive the cellular connectivity event information from the companion wireless device based at least in part on the companion wireless device being the primary device of the paired wireless devices; and determine to not generate the cellular connectivity event information based at least in part on the companion wireless device being the primary device of the paired wireless devices.

19. The apparatus of claim 12, wherein the wireless device includes multiple SIMs, wherein the processor is further configured to cause the wireless device to:

determine a combined network registration status for the multiple SIMs of the wireless device based at least in part on network registration status information for each of the multiple SIMs of the wireless device, wherein the cellular connectivity event information is generated based at least in part on the combined network registration status.

20. The apparatus of claim 12, wherein the processor is further configured to cause the wireless device to:

establish a wireless link with an accessory wireless device; and provide the cellular connectivity event information to the accessory wireless device via the wireless link with the accessory wireless device.

\* \* \* \* \*